(12) United States Patent
Wu (10) Patent No.: US 7,639,696 B2
(45) Date of Patent: Dec. 29, 2009

(54) METHOD FOR TRANSFERRING USER POSITION IDENTIFIER

(75) Inventor: Haijun Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 312 days.

(21) Appl. No.: 10/573,240

(22) PCT Filed: Sep. 7, 2004

(86) PCT No.: PCT/CN2004/001028

§ 371 (c)(1),
(2), (4) Date: Jan. 5, 2007

(87) PCT Pub. No.: WO2005/029773

PCT Pub. Date: Mar. 31, 2005

(65) Prior Publication Data

US 2007/0110028 A1 May 17, 2007

(30) Foreign Application Priority Data

Sep. 25, 2003 (CN) ................................ 03 1 34676

(51) Int. Cl.
*H04L 12/28* (2006.01)
(52) U.S. Cl. .................... 370/395.53; 370/352
(58) Field of Classification Search ............................
370/395.53–395.54, 465–474; 455/426, 455/560; 709/224, 246
See application file for complete search history.

(56) References Cited

U.S. PATENT DOCUMENTS 6,785,265 B2 * 8/2004 White et al. ................. 370/352

(Continued)

FOREIGN PATENT DOCUMENTS

CN 1411210 A 4/2003

(Continued)

OTHER PUBLICATIONS

International Search Report, dated Nov. 4, 2004, corresponding to PCT/CN2004/001028.

(Continued)

*Primary Examiner*—William Trost, IV
*Assistant Examiner*—Emmanuel Maglo
(74) *Attorney, Agent, or Firm*—Conley Rose, P.C.; Grant Rodolph (57) ABSTRACT

The present invention provides a method for transferring user position identifier. By adding two tags i.e. a VlanCI tag and a VlanPI tag for identifying users accessed into broadband access network, the number of users accessing to the broadband access network is increased, and the problem of having insufficient VLAN ID in the broadband access network is solved, so that the broadband access network can hold any number of users. By using this invention, devices in the broadband access network only need to do VlanPI scheduling during the message transmission, without caring about the details of user services, i.e. devices in the broadband access network carry out the management in thick path manner rather than in thin path manner, and the features associated with user services are solved by the cooperation of broadband access devices and BAS devices. Additionally, private tag information in the internal network of users is transferred transparently through the whole network, and the device in the broadband access network will not perform any processing on this information.

22 Claims, 3 Drawing Sheets

U.S. PATENT DOCUMENTS

| | | | |
|---|---|---|---|
| 6,829,252 B1 * | 12/2004 | Lewin et al. | 370/493 |
| 6,947,441 B1 * | 9/2005 | Milbrandt | 370/430 |
| 6,947,739 B2 * | 9/2005 | Yokoyama | 455/426.2 |
| 6,973,044 B1 * | 12/2005 | Barach | 370/252 |
| 7,103,001 B1 * | 9/2006 | Cordsmeyer et al. | 370/241 |
| 7,194,554 B1 * | 3/2007 | Short et al. | 709/246 |
| 7,197,556 B1 * | 3/2007 | Short et al. | 709/224 |
| 2002/0009083 A1 | 1/2002 | Ambe et al. | |
| 2002/0086705 A1 * | 7/2002 | Yokoyama | 455/560 |
| 2003/0081625 A1 * | 5/2003 | Matsufuru | 370/412 |
| 2004/0264443 A1 * | 12/2004 | Beck et al. | 370/352 |
| 2005/0091313 A1 * | 4/2005 | Zhou et al. | 709/204 |
| 2006/0062187 A1 * | 3/2006 | Rune | 370/338 |

FOREIGN PATENT DOCUMENTS

| | | |
|---|---|---|
| CN | 1416239 A | 5/2003 |
| CN | 1426199 A | 6/2003 |
| GB | 2 361 830 A | 10/2001 |
| WO | WO 97/47113 | 12/1997 |
| WO | WO 99/00950 A | 1/1999 |

OTHER PUBLICATIONS

Ooghe, S., et al., *Impact of the Evolution of the Metropolitan Network on the DSL Access Architecture*, IEEE Communications Magazine, vol. 41, No. 2, Feb. 2003, pp. 140-145, XP 011093004.

European Search Report dated Oct. 10, 2006, for EP 04762162.8 (PCT/CN2004/001028), in the name of Huawei Technologies Co., Ltd.

European Office action dated Dec. 21, 2006, for EP 04762162.8, in the name of Huawei Technologies Co., Ltd.

English Abstract of CN 1411210, Published Apr. 16, 2003, previously filed as "On Order".

English Abstract of CN 1416239, Published May 7, 2003, previously filed as "On Order".

English Abstract of CN 1426199, Published Jun. 25, 2003, previously filed as "On Order".

* cited by examiner

METHOD FOR TRANSFERRING USER POSITION IDENTIFIER

CROSS-REFERENCE TO RELATED APPLICATION

This application is a National Phase Patent Application of International Application Number PCT/CN2004/001028, filed on Sep. 7, 2004, which claims priority of Chinese Patent Application Number 03134676.6, filed on Sep. 25, 2003.

FIELD OF THE TECHNOLOGY

The present invention relates to communication techniques, more particularly to a method for transferring user position identifier.

BACKGROUND OF THE INVENTION

The traditional Digital Subscriber Line Access Multiplexer (DSLAM) is a device with complete Asynchronous Transfer Mode (ATM) framework, i.e. it is an ATM-based DSLAM. In an ATM DSLAM network construction, the model of "ATM DSLAM+ATM switching network+Broadband Access Server (BAS)" is generally adopted, a Virtual Path Identifier (VPI) is used for representing a DSLAM office direction, and a Virtual Channel Identifier (VPI) is used for representing users governed by each DSLAM. Because a device number of DSLAM is identified by the VPI, the BAS device can rapidly and accurately locate a user in broadband maintenance management. Meanwhile, because ATM devices take charge in scheduling and managing Virtual Path (VP), configuration of the ATM devices is simple and easily managed.

Being one of protocols in the Ethernet protocol group, IEEE802.1Q standard is for Virtual Local Area Network (VLAN), and it mainly defines the procedure of realizing different local networks virtually in a local network by adopting VLAN technology. When the DSLAM is used as an access device, it can provide two identifying modes, which are port-based VLAN and 802.1Q-based VLAN on the broadband access network. The port-based VLAN identifying mode is setting default VLAN ID of port according to the DSLAM device, and for the 802.1Q-based VLAN identifying mode, since the user carries its own VLAN ID, the user can set effective ports for the carried VLAN ID.

The IEEE802.1Q standard defines Ethernet message format for encapsulating VLAN ID, and the format is shown in Table 1:

TABLE 1

| DstMAC | SrcMAC | Etype | 802.1QTag | Etype | DATA | FCS |

Here, the 4-bytes DstMAC field is destination Media Access Control (MAC) address; the 4-bytes SrcMAC field is source MAC address; the 2-bytes Etype field is used to identify type of the Ethernet identifier and its constant value is 0x8100; the 2-bytes 802.1Qtag field is tag of 802.1Q and the VLAN ID is identified by last 12 bits of this field; the 2-bytes Etype field is used to identify type of posterior DATA field; the DATA field is filled with the data region born by the Ethernet and it contains 46-1500 bytes; the FEC field is used as the checking field and is 4 bytes long.

The broadband access network is generally composed of three layers, including BAS device layer, convergence layer and broadband access device layer. Generally, the broadband access device is responsible for converging user's flow and service, and the user being converged may also carry private VLAN information. The switch in the convergence layer manages further convergence of the user's flow, and the BAS device accomplishes processing such as authentication, management and charging etc. upon access users.

Figure 1:
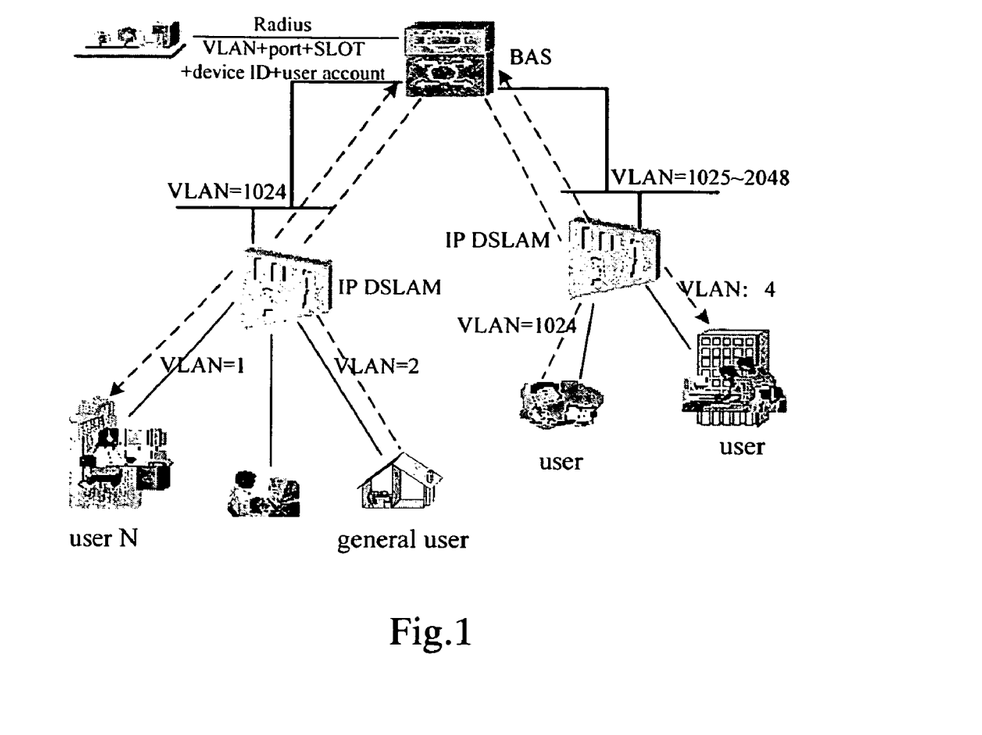
FIG. 1 is a schematic diagram illustrating the procedure of broadband access network transmitting user position information in the prior art.

FIG. 1 is a schematic diagram illustrating the procedure of broadband access network transmitting user position information in the prior art. In current broadband network construction, the Virtual Local Area Network Identifier (VLAN ID) encapsulation format specified in the IEEE 802.1Q standard is mainly adopted to map the information of port or Permanent Virtual Channel (PVC) that user accesses one by one to the 802.1Q-based Ethernet message which is for encapsulating VLAN ID, and send the position information of this user to the BAS device through the VLAN ID born by the data message itself. When finishing the user authentication, the BAS device locates the user's position, device number of the accessed DSLAM and the port of this accessed DSLAM device via the identifier of BAS device, number of single board slots and ports in the BAS device that the broadband access device connects with and the VLAN ID within the user data message. By using this technique, related value added services can be carried out, such as binding an access account number of user with the user's position, implementing the access of dedicated line subscriber, etc.

Figure 2:
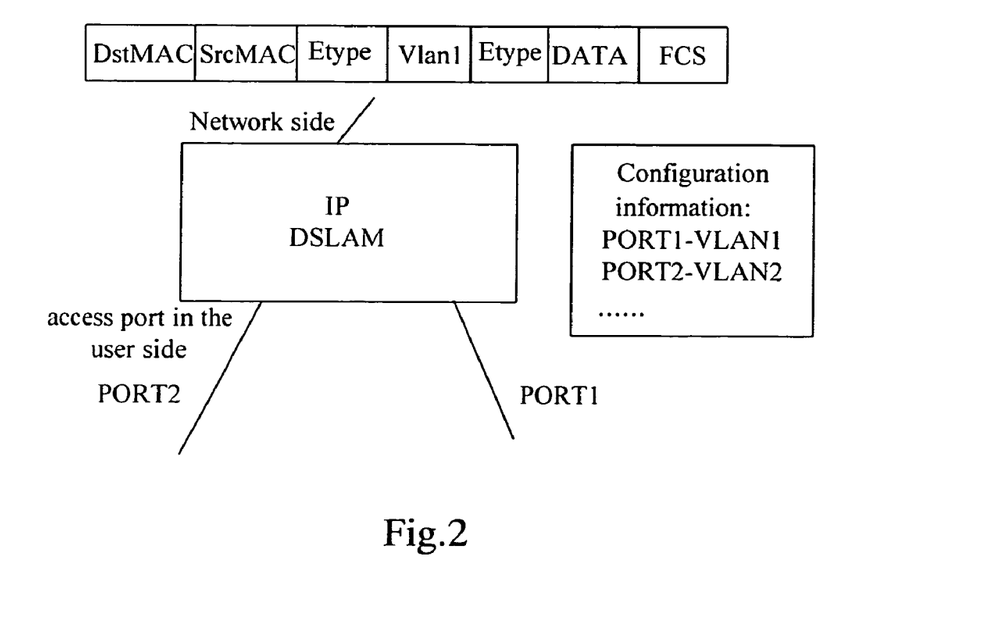
FIG. 2 is a schematic diagram illustrating the procedure of broadband access device transmitting user position information in the prior art.

FIG. 2 is a schematic diagram illustrating the procedure of broadband access device transmitting user position information in the prior art. The broadband access device in this scheme is an IP DSLAM device, user adopts ADSL access mode, and pre-configures the corresponding relationship between port position information through which the user accesses the ADSL (i.e. number of slots and ports and PVC information), and the VLAN ID. After the user data message is imported to the user access port, it is processed by interface devices and forms an Ethernet message thereafter. Here, the processing comprises a set of procedures such as ATM message reforming and self-study for Ethernet address, etc. During the procedure of importing the user data message to the user access port, the access devices will insert a TAG header in conformity with the encapsulation format of 802.1Q into the processed Ethernet message according to the input port information and the PVC information of user. Correspondingly, according to the relationship between the VLAN ID and the port information of user and PVC information, the access device forwards the Ethernet message which is transmitted from the network side and is fit for 802.1Q, removes the TAG header encapsulated in terms of 802.1Q format and generates ATM cells on ADSL line by means of cell partition.

However, the above scheme has the following problems:

1) The user is identified via the VLAN ID carried by data message itself, and according to 802.1Q protocol, there can only be 4096 VLAN IDs at most in one BAS device. If there exists a convergent device between 2-layer network devices and 3-layer network devices, the number of users gathered together by the convergence layer devices is sometimes more than 4K (4096). And because BAS devices are located in the higher layer of network, convergence devices are usually adopted between broadband access devices and BAS devices for convergence.

2) Even in the direct connecting network structure of broadband access devices and BAS devices, with the increasing scale of single-node broadband access devices, connection modes such as cascading mode are introduced in the broadband access devices to access the network for the sake of saving direct connecting optical fibers, and thus it may occur that more than 4096 users access the network and the problem of having insufficient VLAN ID still exists.

SUMMARY OF THE INVENTION

In view of the above, the present invention is to provide a method for transferring user position identifier so as to transfer any number of definite user position information in the current network structure and solve the problem of having insufficient VLAN ID, and thereby, related value added services are realized.

The technical scheme of the present invention is implemented as follows:

A method for transferring user position identifier, which is applicable for a broadband network composed of broadband access server device layer, convergence layer and broadband access device layer, the method comprises:

a. setting a tag for each broadband access device and for each non-cascading access port in the broadband access device, respectively;

b. deciding whether the port receiving message in the broadband access device is a cascading port and if yes, directly transferring the message received on the port, or otherwise, inserting the tag set in step a into the message transmitted through this port in a fixed encapsulation format and transferring this message;

c. after broadband access server (BAS) receiving the message transferred in step b, implementing user identification according to the tag having been inserted into the message and performing associated processing.

Preferably, the insertion in step b comprises: the broadband access device independently inserting the tag set in step a into the received message, or the broadband access device and a convergence layer device together being employed to insert the tag set in step a into the received message.

Preferably, the associated processing in step c comprises:

c1. reforming the received message and deciding whether the message is a data message or a control message, and if it is a data message, execute step c2, and if it is a control message, execute step c3;

c2. removing the tag from the data message, checking binding relationship between the tag in the data message and the IP address of user, performing security checking, and transferring the qualified data message being checked;

c3. after implementing an authentication to the user, checking binding relationship between the user's account and physical access position according to the tag carried in the control message, performing user quantity control, and sending the tag, the user account and password to an AAA server for processing authentication.

Preferably, in step a, the tag set for the broadband access device is a VLAN Path Identifier (VlanPI) tag, the tag set for non-cascading access port in the broadband access device is a VLAN Channel Identifier (VlanCI) tag, and the message is an Ethernet message.

Preferably, the fixed encapsulation format in step b comprises: sequentially encapsulating destination Media Access Control (MAC) address, source MAC address, type of Ethernet VlanPI tag, VlanPI, type of Ethernet VlanCI tag, VlanCI, type of data message, data being transmitted, and checking field.

Preferably, in step b the broadband access device comprises an IP DSLAM device, or an Ethernet switch, or a Cable Modem Termination System (CMTS) device using Hybrid Fiber Coax (HFC) system.

Preferably, when the broadband access device in step b is an IP DSLAM device composed of main control board, user interface board and backboard, said inserting the VlanPI and the VlanCI in step b further comprises:

The user interface board inserting the VlanCI tag into the received Ethernet message and the main control board inserting the VlanPI tag into the received Ethernet message, or, the user interface board inserting the VlanCI tag and the VlanPI tag into the received Ethernet message, and the main control board directly transferring this message according to the VlanPI tag and the destination MAC address in the Ethernet message, or, the user interface board inserting the VlanCI tag into the received Ethernet message, the main control board directly transferring this message according to the VlanCI tag and the destination MAC address in the Ethernet message, a convergence layer device inserting the VlanPI tag of the device from which the message is transmitted into the received Ethernet message without a VlanPI tag, and transferring the message according to this VlanPI tag and the destination MAC address in the Ethernet message.

Preferably, the user in step c is a general user or a user with a private tag of internal network.

Preferably, when the user with inserted tag is a user with private tag of internal network, in step b, information of the private tag of internal network is encapsulated in the VlanCI tag.

In the present invention, two tags, which are VLAN Circuit Identifier (VlanCI) and VLAN Path Identifier (VlanPI), are used to identify users accessing the bandwidth access network, so that the amount of users allowed to access the broadband access network is increased and the problem of having insufficient VLAN ID is solved, thus the number of users allowed to access the broadband access network is not restricted. When performing the present invention, devices in the broadband access network need only do VlanPI scheduling during the message transmission, without caring about the details of user services, i.e. devices in the broadband access network carry out the management in thick path manner rather than in thin path manner, and the features associated with user services are solved by the cooperation of broadband access devices and BAS devices. Meanwhile, for the multicast services, less bandwidth for convergence devices will be occupied because the convergence device does not deal with any details of user service. In addition, private tag information in the internal network of users is transferred transparently through the whole network, and the device in the broadband access network will not perform any processing on this information.

EMBODIMENTS OF THE INVENTION

The present invention will be described in detail hereinafter with reference to the accompanying drawings and specific embodiments.

In the present invention, multi-layer tags are employed to identify user positions in the broadband access network, thus any number of user position identifiers can be transferred in the broadband network.

In an embodiment of the invention, two tags, i.e. VLAN Circuit Identifier (VlanCI) and VLAN Path Identifier (VlanPI), are introduced to the broadband access network. The VlanCI is like the VCI in ATM network, which is used to identify a non-cascading port of broadband access device; the VlanPI is like the VPI in ATM network, which is used to identify an independent broadband access device or a cascading device. In this way, physical access position of a user in the broadband access device can be located according to the VlanCI and the VlanPI.

According to 802.1Q standard, the Ethernet message format defined in the present embodiment for encapsulating VLAN ID is shown in Table 2:

TABLE 2

| DstMAC | SrcMAC | Etype | VlanPI | Etype | VlanCI | Etype | DATA | FCS |
|--------|--------|-------|--------|-------|--------|-------|------|-----|

Here, the 4-bytes DstMAC field is destination MAC address; the 4-bytes SrcMAC field is source MAC address; the 2-bytes Etype field is used to identify type of the Ethernet VLAN Path identifier and its constant value is 0x8100; the VlanPI is set as the 2-bytes Tag field defined in the 802.1Q and the VLAN ID of last 12 bits is VlanPI; the Etype field is used to identify type of the Ethernet VlanCI, and it applies idle fields other than 0x8100 which can be of any bytes. Generally, 2-bytes is occupied when considering the consistence with the preceding one. The VlanCI is set as the 2-bytes Tag field defined in the 802.1Q and the VLAN ID of last 12-bits is VlanCI. The Etype field used to identify type of posterior DATA field is of 2-bytes; the DATA field is data field born by the Ethernet and it contains 46-1500 bytes; the FCS field is used as the checking field and is 4 bytes long.

Figure 3:
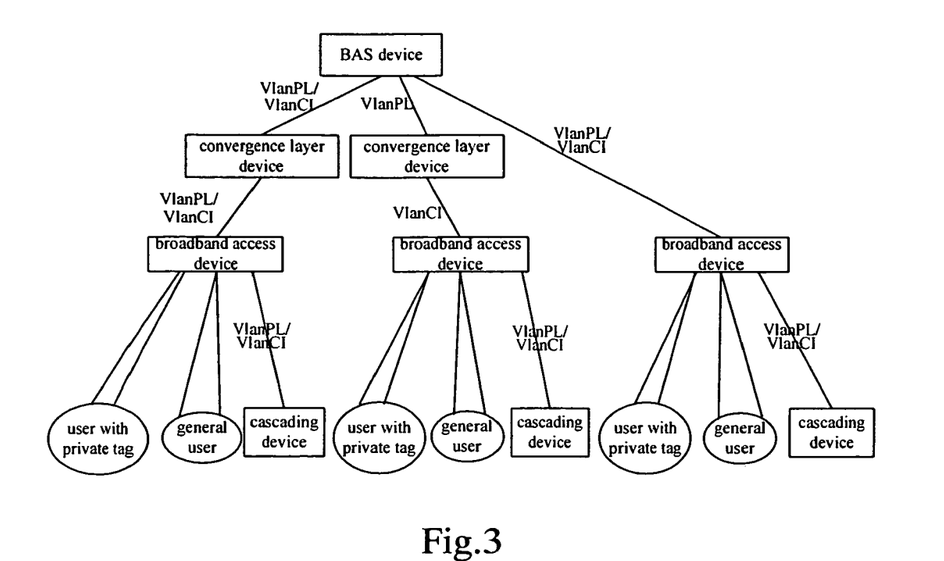
FIG. 3 is a schematic diagram illustrating the procedure of user position transmission by using multi-layer tags in the present invention.

FIG. 3 is a schematic diagram illustrating the procedure of user position transmission by using multi-layer tags in the embodiment. If it is a general user who accesses the broadband access device, a VlanCI tag and a VlanPI tag will be inserted into the Ethernet message complying with 802.1Q standard transmitted by the user; if it is a user with private tag of the internal network who accesses the broadband access device, a VlanCI tag and a VlanPI tag will be inserted into the Ethernet message complying with 802.1Q standard transmitted by this user, and the private tag is encapsulated into the VlanCI tag. If a cascading device is associated to the broadband access device, no tag will be inserted into the Ethernet message complying with 802.1Q standard transmitted by the cascading device. Because a cascading device is composed of one or more broadband access devices, which is equal to the combination of a plurality of user access devices, corresponding tags have already been inserted into Ethernet messages transmitted by the cascading device at the first time when the user is connected. The convergence layer device in the broadband access network singly identifies the VlanPI tag and processes services related to that tag only. It does no process to the VlanCI tag and the private tag of the user. The BAS device in the broadband access network processes the VlanCI tag and the VlanPI tag for the purpose of identifying the unique user position message, and no process will be given to the private tag of the user, i.e. the BAS device knows through which broadband access device the user is connected according to the VlanPI tag, and through which port of this broadband access device the user is connected according to the VlanCI tag.

In the present embodiment, an IP DSLAM device is used as the broadband access device, and the broadband access device can also be an Ethernet switch or a Cable Modem Termination System (CMTS) applying Hybrid Fiber Coax (HFC) system. The IP DSLAM device is generally composed of main control board, user interface board and backboard, the user accesses through the user interface board. After performing flow conversion and convergence, the flow is transferred by the relay module in the main control board. The corresponding relationship between information of port accessed by user, PVC information, and the VLAN ID has been configured in the IP DSLAM device beforehand, so has cascading ports specially used for accessing cascading devices in the IP DSLAM device. Methods for inserting multi-layer tags are presented in the following three schemes.

Scheme One: the insertion of multi-layer tags is fulfilled by the user interface board and the main control board in the IP DSLAM device together. As to the general user and user with private tag of internal network, the user interface board inserts the VlanCI tag into the Ethernet message transmitted by the user, where the private tag of internal network is encapsulated in the VlanCI tag, and the main control board inserts the VlanPI tag into the Ethernet message transmitted by the user. As to the cascading device accessing through the cascading port, the user interface board and the main control board do not insert any tag into the transmitted Ethernet message.

Scheme Two: the insertion of multi-layer tags is achieved by the user interface board in the IP DSLAM device. As to the general user and user with private tag of internal network, the user interface board inserts the VlanCI tag and the VlanPI tag into the Ethernet message transmitted by the user, where the private tag of internal network is encapsulated in the VlanCI tag, and the main control board directly transfers the message according to the VlanPI tag and the destination MAC address in the Ethernet message. As to the cascading device accessing through the cascading port, the user interface board does not insert any tag into the transmitted Ethernet message.

Scheme Three: the insertion of multi-layer tags is accomplished by the user interface board in IP DSLAM device and the device in convergence layer together. As to the general user and user with private tag of internal network, the user interface board inserts the VlanCI tag and the VlanPI tag into the Ethernet message transmitted by these users, where the private tag of internal network is encapsulated in the VlanCI tag, and the main control board directly transfers the message according to the VlanPI tag and the destination MAC address in the Ethernet message. As to the cascading device accessed through the cascading port, the user interface board does not insert any tag into the transmitted Ethernet message. After receiving the Ethernet message without any VlanPI tag, devices in the convergence layer firstly insert the VlanPI tag of the device from which the message is transmitted into the Ethernet message, and then transfer the Ethernet message according to this VlanPI tag and the destination MAC address in the message.

Figure 4:
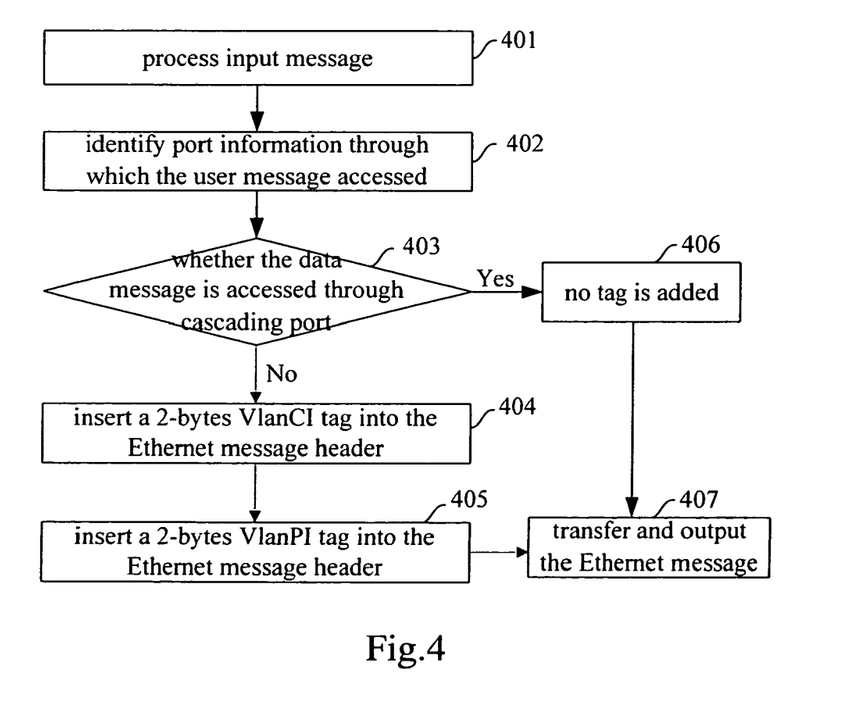
FIG. 4 is a flowchart of the present invention illustrating the processing procedure of broadband access device inserting multi-layer tags.

FIG. 4 is a flowchart of the embodiment illustrating the processing procedure of broadband access device inserting multi-layer tags.

Step 401: Process input message, e.g. reforming the message and so on;

Step 402: The broadband access device identifies port information through which user message accesses;

Step 403: It is decided by the broadband access device whether the transmitted data message is accessed through cascading port or not, and if yes, execute step 406; otherwise, execute step 404;

Step 404: Insert the VlanCI tag which has been preconfigured by the broadband access device into the Ethernet message, and the total length of the tag is 2 bytes;

Step 405: According to the VlanPI preconfigured by the broadband access device, a VlanPI tag is inserted into the Ethernet message, and the total length of the tag is 2 bytes;

Step 406: No tag is added;

Step 407: The broadband access device transfers and outputs the processed Ethernet message according to the destination MAC address in that Ethernet message.

Figure 5:
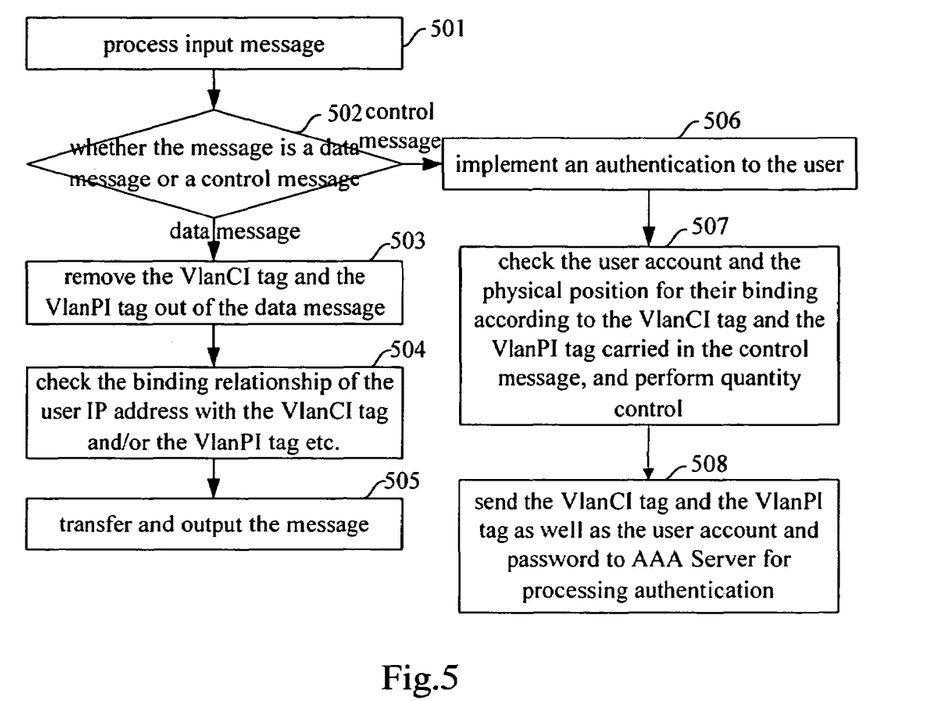
FIG. 5 is a flowchart of the present invention illustrating the procedure of BAS device processing Ethernet message with multi-layer tags.

FIG. 5 is a flowchart of the embodiment illustrating the procedure of BAS device processing Ethernet message with multi-layer tags.

Step 501: Process input message, e.g. reforming the message and so on;

Step 502: Determine whether the message is a data message or a control message according to protocol number of the input message, and if it is a data message, execute step 503; if it is a control message, execute step 506;

Step 503: Remove the VlanCI tag and the VlanPI tag out of the data message;

Step 504: Check the binding relationship of the user IP address with the VlanCI tag and/or the VlanPI tag in the data message, and perform various security checking;

Step 505: Transfer and output the qualified data message being checked, and end the above procedure;

Step 506: Execute an authentication to the user;

Step 507: Check the user's account and physical access position for their binding relationship according to the VlanCI tag and the VlanPI tag carried in the control message, and perform user quantity control;

Step 508: Send the VlanCI tag and the VlanPI tag as well as the user account and password to an Authentication Authorization and Accounting (AAA) Server, such as a RADIUS (Remote Authentication Dial-In User Service) Server, for processing authentication, and end the above procedure.

The above descriptions are all for uplink services. The process of downlink services is similar to that of uplink services, after processing the message received from upper layer device, the BAS device in the broadband access network adds an Ethernet message header, a VlanPI tag and a VlanCI tag for the corresponding message, and transfers the message. When the broadband access device receives the Ethernet message sent by the BAS device, it will remove the VlanPI tag and the VlanCI tag in the message, and transfer the DATA information left to the user.

The above description is just a preferable embodiment of the present invention, and the protection scope of the invention is not confined thereof. It will be understood that various changes in forms and details within the spirit and principle of the invention, are not beyond the protection scope of this invention.

The invention claimed is:

1. A method for identifying user position, comprising:
   setting a first tag corresponding to each of broadband access devices and a second tag corresponding to each of non-cascading ports in each of the broadband access devices, wherein the first tag and the second tag are employed to identify user positions; and wherein:
   when a port receiving a message in a broadband access device among the broadband access devices is a cascading port, transferring the message received from the cascading port;
   and when a port receiving a message in the broadband access device is a non-cascading port, inserting the first tag corresponding to the broadband access device and the second tag corresponding to the non-cascading port into the message received from the non-cascading port, and transferring the message with the inserted first tag and second tag; and
   when a broadband access server receiving the message carrying the first tag and the second tag from the non-cascading port, identifying, by the broadband access server, user position according to the first tag and the second tag inserted into the message; wherein the broadband access server knows though which broadband access device the user is connected according to the first tag, and through which port of the broadband access device the user is connected according to the second tag.

2. The method according to claim 1, wherein the inserting of the first tag and the second tag comprises: the broadband access device independently inserting the first tag and the second tag into the message received from the non-cascading port, or the broadband access device and a convergence layer device together being employed to insert the first tag and the second tag into the message received from the non-cascading port.

3. The method according to claim 1, further comprising:
   reforming the message received from the non-cascading port and deciding whether the message received from the non-cascading port is a data message or a control message;
   if the message received from the non-cascading port is a data message, removing the first tag and the second tag from the data message, checking binding relationship between the first and second tags in the data message and the IP address of user, performing security checking, and transferring the qualified data message being checked;
   if the message received from the non-cascading port is a control message, after implementing an authentication to the user of the control message, checking binding relationship between the user's account and physical access position according to the first and second tags carried in the control message, performing user quantity control, and sending the first and second tags, the user account and password to an AAA server for authentication.

4. The method according to claim 1, wherein the first tag corresponding to the broadband access device is a VLAN Path Identifier (VlanPI) tag, the second tag corresponding to the non-cascading port in the broadband access device is a VLAN Channel Identifier (VlanCI) tag, and said message received from the non-cascading port is an Ethernet message.

5. The method according to claim 4, wherein the first tag and the second tag are encapsulated in a fixed encapsulation format and wherein the fixed encapsulation format sequentially comprises: destination Media Access Control (MAC) address, source MAC address, type of Ethernet VlanPI tag, VlanPI, type of Ethernet VlanCI tag, VlanCI, type of data message, data being transmitted, and checking field.

6. The method according to claim 1, wherein the broadband access device comprises: an IP DSLAM device, or an Ethernet switch, or a Cable Modem Termination System (CMTS) device using Hybrid Fiber Coax (HFC) system.

7. The method according to claim 1, wherein the first tag corresponding to the first broadband access device is a VLAN Path Identifier (VlanPI) tag, the second tag corresponding to the non-cascading port in the first broadband access device is a VLAN Channel Identifier (VlanCI) tag, and said message received from the non-cascading port is an Ethernet message, and wherein the broadband access device is an IP DSLAM device composed of main control board, user interface board and backboard, and the method further comprises:

the user interface board inserting the VlanCI tag into the received Ethernet message and the main control board inserting the VlanPI tag into the received Ethernet message;

or, the user interface board inserting the VlanCI tag and the VlanPI tag into the received Ethernet message, and the main control board directly transferring this message according to the VIanPI tag and the destination MAC address carried in the Ethernet message;

or, the user interface board inserting the VlanCI tag into the received Ethernet message, the main control board directly transferring this message according to the VlanCI tag and the destination MAC address in the Ethernet message, a convergence layer device inserting the VIanPI tag of the device from which the message is transmitted into the received Ethernet message without a VIanPI tag, and transferring the message according to this VIanPI tag and the destination MAC address in the Ethernet message.

8. The method according to claim 1, wherein the user is a general user or a user with a private tag of internal network.

9. The method according to claim 8, wherein the second tag corresponding to the non-cascading port in the first broadband access device is a VLAN Channel Identifier (VlanCI) tag, and wherein the user with an inserted tag is a user with a private tag of internal network, and the information of the private tag of internal network is encapsulated in the VlanCI tag.

10. A broadband access device, comprising:
one or more cascading ports and one or more non-cascading ports, wherein a first tag is provided for identifying the broadband access device, and a second tag is provided for identifying each of the non-cascading ports, and the first tag and the second tag are employed to identify user positions; and the broadband access device is capable of receiving a message from one of the cascading ports, and transferring the message received from the cascading port;

the broadband access device is capable of receiving a message from one of the non-cascading ports, inserting the first tag corresponding to the broadband access device and the second tag corresponding to the non-cascading port into the message received from the non-cascading port, and transferring the message with the inserted first tag and second tag for identifying user position.

11. The broadband access device according to claim 10, wherein the first tag corresponding to the broadband access device is a VLAN Path Identifier (VlanPI) tag;

the second tag corresponding to the non-cascading port in the broadband access device is a VLAN Channel Identifier (VlanCI) tag; and the message received from the non-cascading port is an Ethernet message.

12. The broadband access device according to claim 10, wherein the first tag and the second tag are encapsulated in a fixed format.

13. The broadband access device according to claim 12, wherein the fixed format comprises information on destination Media Access Control, MAC, address, source MAC address, type of Ethernet VlanPI tag, VlanPI, type of Ethernet VlanCI tag, VlanCI, type of data message, data being transmitted, and checking field.

14. The broadband access device according to claim 10, wherein the broadband access device comprises an IP Digital Subscriber Line Access Multiplexer (DSLAM) device, or an Ethernet switch, or a Cable Modem Termination System (CMTS) device using Hybrid Fiber Coax (HFC) system.

15. The broadband access device according to claim 13, wherein the first tag corresponding to the broadband access device is a VLAN Path Identifier (VlanPI) tag, and the second tag corresponding to the non-cascading port in the broadband access device is a VLAN Channel Identifier (VlanCI) tag; and wherein the broadband access device comprises a main control board, a user interface board and a backboard;

the user interface board is capable of inserting the VlanCI tag into the message received from the non-cascading port, and the main control board is capable of inserting the VlanPI tag into the message received from the non-cascading port;

or the user interface board is capable of inserting the VlanCI tag and the VlanPI tag into the message received from the non-cascading port, and the main control board is capable of transferring the message according to the VlanPI tag and the destination MAC address carried in the message received from the non-cascading port;

or the user interface board is capable of inserting the VlanCI tag into the message received from the non-cascading port, and the main control board is capable of transferring the message received from the non-cascading port according to the VlanCI tag and the destination MAC address carried in the message received from the non-cascading port.

16. A system for identifying user position, comprising: a plurality of broadband access devices and a broadband access server, each of the broadband access devices is provided with a first tag, and each of non-cascading ports in the broadband access device is provided with a second tag, and the first tag and the second tag are employed to identify user positions; wherein a broadband access device among the plurality of broadband access devices is capable of receiving a message from a non-cascading pod, inserting the first tag corresponding to the broadband access device and the second tag corresponding to the non-cascading pod into the message received from the non-cascading pod, and transferring the message with the inserted first tag and second tag;

the broadband access server is capable of receiving the message carrying the first tag and the second tag, and identifying the user position according to the first tag and the second tag having been inserted into the message; wherein the broadband access server knows through which broadband access device the user is connected according to the first tag, and through which port of the broadband access device the user is connected according to the second tag.

17. The system according to claim 16, further comprising:
a convergence layer device; and
the first tag and the second tag are inserted, by the broadband access device and the convergence layer device, into the message received from the non-cascading pod.

18. The system according to claim 17, wherein the first tag corresponding to the broadband access device is a VLAN Path Identifier (VlanPI) tag, and
wherein the convergence layer device is capable of inserting the VlanPI tag of the device from which the message is transmitted, into the message without a VlanPI tag, and transferring the message according to the VlanPI tag and the destination MAC address carried in the message.

19. The system according to claim 16, wherein the broadband access device is capable of independently inserting the first tag and the second tag into the message received from the non-cascading port.

20. The system according to claim 16, wherein the broadband access server is capable of:
reforming the message and deciding whether the message is a data message or a control message; and
removing the first tag and the second tag from the data message if the message is a data message, checking binding relationship between the first tag and the second tag carried in the data message and the IP address of user, performing security checking, and transferring the data message when the data message is qualified;
authenticating the user of the control message if the message is a control message, checking binding relationship between the user account and the user position according to the first tag and the second tag carried in the control message, performing user quantity control, and sending the first tag and the second tag, the user account and password to an AAA server for authentication.

21. The system according to claim 16, wherein the user is a general user or a user with a private tag of internal network.

22. The system according to claim 16, wherein the second tag corresponding to the non-cascading port in the broadband access device is a VLAN Channel Identifier (VlanCI) tag, and
wherein the user is a user with a private tag of internal network, and the information of the private tag of internal network is encapsulated into the VlanCI tag.

* * * * *

UNITED STATES PATENT AND TRADEMARK OFFICE
CERTIFICATE OF CORRECTION

PATENT NO. : 7,639,696 B2  Page 1 of 1
APPLICATION NO. : 10/573240
DATED : December 29, 2009
INVENTOR(S) : Haijun Wu It is certified that error appears in the above-identified patent and that said Letters Patent is hereby corrected as shown below:

Col. 10 line 55, change "pod" to "port";
Col. 10 line 57, change "pod" to "port";
Col. 10 line 58, change "pod" to "port".

Claim 17, line 5, change "pod" to "port".

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,639,696 B2  Page 1 of 1
APPLICATION NO. : 10/573240
DATED : December 29, 2009
INVENTOR(S) : Haijun Wu It is certified that error appears in the above-identified patent and that said Letters Patent is hereby corrected as shown below:

Col. 10 line 55, change "pod" to "port";
Col. 10 line 57, change "pod" to "port";
Col. 10 line 58, change "pod" to "port".

Col. 11, Claim 17, line 7, change "pod" to "port".

This certificate supersedes the Certificate of Correction issued April 20, 2010.

Signed and Sealed this

Eleventh Day of May, 2010

David J. Kappos
*Director of the United States Patent and Trademark Office*